United States Patent
Ohno

(10) Patent No.: US 11,481,748 B2
(45) Date of Patent: Oct. 25, 2022

(54) SETTLEMENT CONTROL SYSTEM, SETTLEMENT CONTROL DEVICE, TERMINAL DEVICE, SETTLEMENT CONTROL METHOD, PROCESSING METHOD, AND PROGRAM

(71) Applicant: NEC CORPORATION, Tokyo (JP)

(72) Inventor: Takeo Ohno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 43 days.

(21) Appl. No.: 16/650,547

(22) PCT Filed: Mar. 8, 2018

(86) PCT No.: PCT/JP2018/008989
§ 371 (c)(1),
(2) Date: Mar. 25, 2020

(87) PCT Pub. No.: WO2019/064635
PCT Pub. Date: Apr. 4, 2019

(65) Prior Publication Data
US 2020/0311705 A1 Oct. 1, 2020

(30) Foreign Application Priority Data

Sep. 29, 2017 (JP) .............................. JP2017-189557

(51) Int. Cl.
*G06Q 20/00* (2012.01)
*G06Q 20/20* (2012.01)
(Continued)

(52) U.S. Cl.
CPC ......... *G06Q 20/202* (2013.01); *G06Q 20/204* (2013.01); *G06Q 20/341* (2013.01);
(Continued)

(58) Field of Classification Search
CPC .................................................. G06Q 20/202
See application file for complete search history.

(56) References Cited

U.S. PATENT DOCUMENTS

| 2008/0067240 | A1* | 3/2008 | Nakano | H04L 9/3273 |
| | | | | 235/492 |
| 2014/0379570 | A1* | 12/2014 | Akashika | G06Q 20/352 |
| | | | | 705/41 |

FOREIGN PATENT DOCUMENTS

| JP | 2007-122099 A | 5/2007 |
| JP | 2013-137661 A | 7/2013 |
| JP | 2017-068297 A | 4/2017 |

OTHER PUBLICATIONS

International Search Report of PCT/JP2018/008989 dated May 29, 2018 [PCT/ISA/210].

* cited by examiner

*Primary Examiner* — Rokib Masud
(74) *Attorney, Agent, or Firm* — Sughrue Mion, PLLC

(57) ABSTRACT

The present invention includes: a plurality of terminal devices configured to wirelessly communicate with a balance storage medium; and a settlement control device that is communicably connected to each of the plurality of terminal devices. The settlement control device includes an update instruction distribution unit that distributes, to each of the terminal devices, balance update instruction information including a balance update instruction and an update instruction identification number corresponding to the balance update instruction. The terminal device includes an update control unit that performs balance update processing corresponding to the balance update instruction on the basis of a comparison between an update instruction identification number that has been acquired from the balance storage medium and that is recorded in the balance storage medium, (Continued)

and the update instruction identification number included in the balance update instruction information.

8 Claims, 6 Drawing Sheets

(51) Int. Cl.
    *G06Q 20/34*     (2012.01)
    *G06Q 40/02*     (2012.01)

(52) U.S. Cl.
    CPC ......... *G06Q 20/349* (2013.01); *G06Q 20/352* (2013.01); *G06Q 40/02* (2013.01)

SETTLEMENT CONTROL SYSTEM, SETTLEMENT CONTROL DEVICE, TERMINAL DEVICE, SETTLEMENT CONTROL METHOD, PROCESSING METHOD, AND PROGRAM

This application is a National Stage of International Application No. PCT/JP2018/008989, filed Mar. 8, 2018, claiming priority to Japanese Patent Application No. 2017-189557, filed Sep. 29, 2017, the contents of all of which are incorporated herein by reference in their entirety.

TECHNICAL FIELD

The present invention relates to a settlement control system, a settlement control device, a terminal device, a settlement control method, a processing method, and a program.

BACKGROUND ART

There is utilized a technology in which a user has a balance storage card, which the user carries with a balance stored on the balance storage card instead of recording a balance in a bank or other financial institution, and uses the balance storage card for settlement of purchased merchandise. A technique related to this technology is disclosed in Patent Document 1. The technique of Patent Document 1 is one which, even if a failure occurs between a transaction device that reads a transaction history from an electronic money recording medium and settles the transaction and a transaction management device, is capable of performing point calculation without being affected as much as possible by the failure.

CITATION LIST

Patent Literature

[Patent Document 1]
Japanese Unexamined Patent Application, First Publication No. 2007-122099

SUMMARY OF INVENTION

Problem to be Solved by the Invention

In the technique as described above, communication failure also occurs between terminal devices, which are arranged in various remote locations for settlement proxy and that perform communication such as non-contact communication with the balance storage card, and a central settlement control device that communicatively connects to the plurality of the terminal devices to manage settlements. In such a technique, it is necessary for the settlement control device to appropriately perform balance update instructions such as deposits to and withdrawals from the balance storage card to update the balance of the balance storage card. Even in an area where the communication connection between the terminal device and the settlement control device often becomes unstable, the settlement control device needs to appropriately update the balance of the balance storage card on the basis of the balance update instruction by which the settlement control device has received an instruction.

Therefore, the present invention has as its object to provide a settlement control system, a settlement control device, a terminal device, a settlement control method, a processing method, and a program that can solve the issue described above.

Means for Solving the Problem

According to the first aspect of the present invention, a settlement control system has a plurality of terminal devices configured to wirelessly communicate with a balance storage medium, and a settlement control device that is communicably connected to each of the plurality of terminal devices. The settlement control device includes an update instruction distribution unit configured to distribute, to each of the terminal devices, balance update instruction information including a balance update instruction and an update instruction identification number corresponding to the balance update instruction. The terminal device includes an update control unit configured to perform balance update processing corresponding to the balance update instruction on the basis of a comparison between an update instruction identification number that has been acquired from the balance storage medium and that is recorded in the balance storage medium, and the update instruction identification number included in the balance update instruction information.

According to a second aspect of the present invention, the settlement control device includes an update instruction distribution unit configured to distribute balance update instruction information including a balance update instruction and an update instruction identification number corresponding to the balance update instruction to each of a plurality of terminal devices that wirelessly communicate with a balance storage medium.

According to a third aspect of the present invention, a terminal device includes an update instruction receiving unit configured to receive from a settlement control device balance update instruction information including a balance update instruction and an update instruction identification number corresponding to the balance update instruction; and an update control unit configured to perform balance update processing corresponding to the balance update instruction on the basis of a comparison between an update instruction identification number that has been acquired from a balance storage medium and that is recorded in the balance storage medium, and the update instruction identification number included in the balance update instruction information.

According to a fourth aspect of the present invention, in a settlement control method of a settlement control system having a plurality of terminal devices that wirelessly communicate with a balance storage medium, and a settlement control device that is communicably connected to each of the plurality of terminal devices. The settlement control method includes distributing, by the settlement control device, to each of the terminal devices, balance update instruction information including a balance update instruction and an update instruction identification number corresponding to the balance update instruction; and performing, by the terminal device, balance update processing corresponding to the balance update instruction on the basis of a comparison between an update instruction identification number that has been acquired from the balance storage medium and that is recorded in the balance storage medium, and the update instruction identification number included in the balance update instruction information.

According to a fifth aspect of the present invention, a settlement control method includes distributing balance update instruction information including a balance update instruction and an update instruction identification number corresponding to the balance update instruction to each of a plurality of terminal devices that wirelessly communicate with a balance storage medium.

According to a sixth aspect of the present invention, a processing method includes receiving from a settlement control device balance update instruction information including a balance update instruction and an update instruction identification number corresponding to the balance update instruction; and performing balance update processing corresponding to the balance update instruction on the basis of a comparison between an update instruction identification number that has been acquired from a balance storage medium and that is recorded in the balance storage medium, and the update instruction identification number included in the balance update instruction information.

According to a seventh aspect of the present invention, a program causes a computer of a settlement control device to execute processes, the processes includes distributing balance update instruction information including a balance update instruction and an update instruction identification number corresponding to the balance update instruction to each of a plurality of terminal devices that wirelessly communicate with a balance storage medium.

According to an eighth aspect of the present invention, a program causes a computer of a terminal device to execute processes, the processes includes receiving from a settlement control device balance update instruction information including a balance update instruction and an update instruction identification number corresponding to the balance update; and performing balance update processing corresponding to the balance update instruction on the basis of a comparison between an update instruction identification number that has been acquired from a balance storage medium and that is recorded in the balance storage medium, and the update instruction identification number included in the balance update instruction information.

Advantageous Effects of Invention

According to the present invention, the settlement control device can appropriately update the balance of the balance storage card on the basis of the balance update instruction by which the settlement control device received an instruction, even in an area where the communication connection between the terminal device and the settlement control device often becomes unstable.

DESCRIPTION OF EMBODIMENTS

Hereinbelow, a settlement control system according to an embodiment of the present invention will be described with reference to the drawings.

Figure 1:
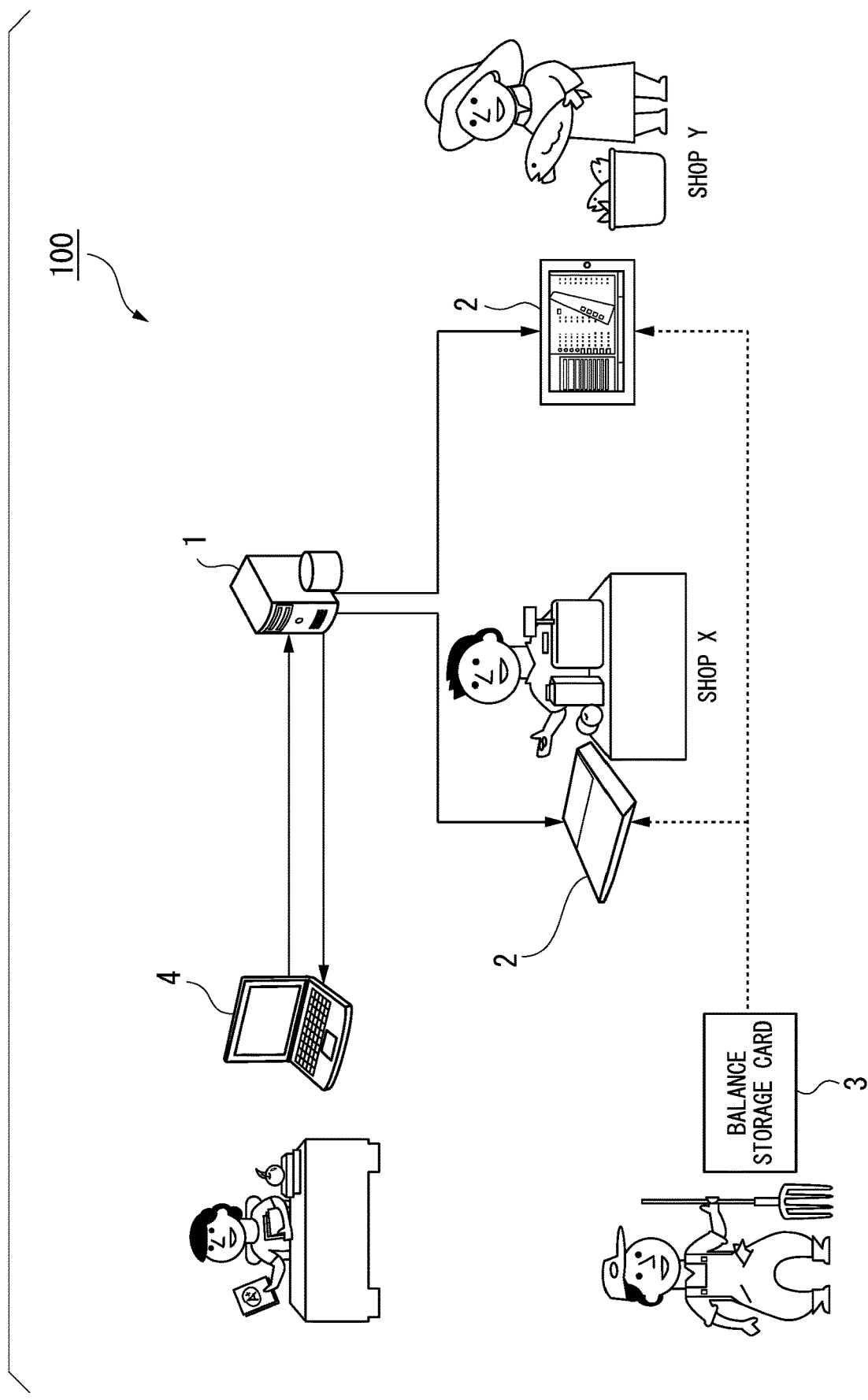
FIG. 1 is an outline drawing of a settlement control system according to a present embodiment.

FIG. 1 is an outline drawing of the settlement control system according to this embodiment.

As shown in this drawing, in a settlement control system 100, a settlement control device 1 and a plurality of POS (Point Of Sales System) terminals 2 are connected via a communication network. Each POS terminal 2 is installed in a shop as an example. The POS terminal 2 performs non-contact communication with a balance storage card 3 in the possession of a user who has visited the shop. The balance storage card 3 is a recording medium that transmits/receives and stores information by non-contact communication using RFID technology, such as an IC card. Although a process using the balance storage card 3 will be described in the present embodiment, the balance storage card 3 may be replaced with anything else that is a storage medium. The balance of money in the user's possession, which is recorded in a server of a financial institution such as a bank, is normally recorded on the balance storage card 3. The user performs settlement of purchased merchandise at shops using the balance storage card 3 on which the balance is recorded. Specifically, the user shows a clerk merchandise to be purchased that was picked up in the shop and uses the balance of money stored in the balance storage card 3 for settlement of the sales amount of the merchandise that the clerk has input to the POS terminal 2. The user holds the balance storage card 3 up to the POS terminal 2. At this time, the POS terminal 2 and the balance storage card 3 perform non-contact communication and in conjunction with each other perform a settlement process for subtracting the sales amount of the merchandise from the balance recorded in the balance storage card 3.

In such a settlement control system 100, for example, it is conceivable for the user's employer or a management organization to issue to the settlement control device 1 an instruction for paying the user wages or benefits, and for a settlement agent to issue to the settlement control device 1 an instruction for withdrawing a settlement amount from the user's balance. A balance update instruction source such as an employer, a management organization, or a settlement agent who gives such an instruction transmits a balance update instruction to the settlement control device 1 using the own instruction terminal 4. The balance update instruction includes a user ID that is user identification information, the type of balance update instruction indicating either a deposit process or a withdrawal process, the amount for the deposit process or the withdrawal process, and the like. The instruction terminal 4 is operated to transmit a balance update instruction from the instruction terminal 4 to the settlement control device 1. Thereby, the instruction terminal 4 transmits a balance update instruction to the settlement control device 1. The instruction terminal 4 may be a personal computer or a portable terminal.

Here, when the distance between the settlement control device 1 and the POS terminal 2 is long, and the settlement control system 100 is installed in an area where the communication environment is not developed, it is conceivable that communication between the settlement control device 1 and the POS terminal 2 will be interrupted. Even in such a case, the settlement control device 1 needs to update the balance of the balance storage card 3 of the user concerned to the appropriate amount based on the balance update instruction received from the instruction terminal 4. Hereinbelow, the settlement control system 100 that solves this problem will be described more specifically.

Figure 2:
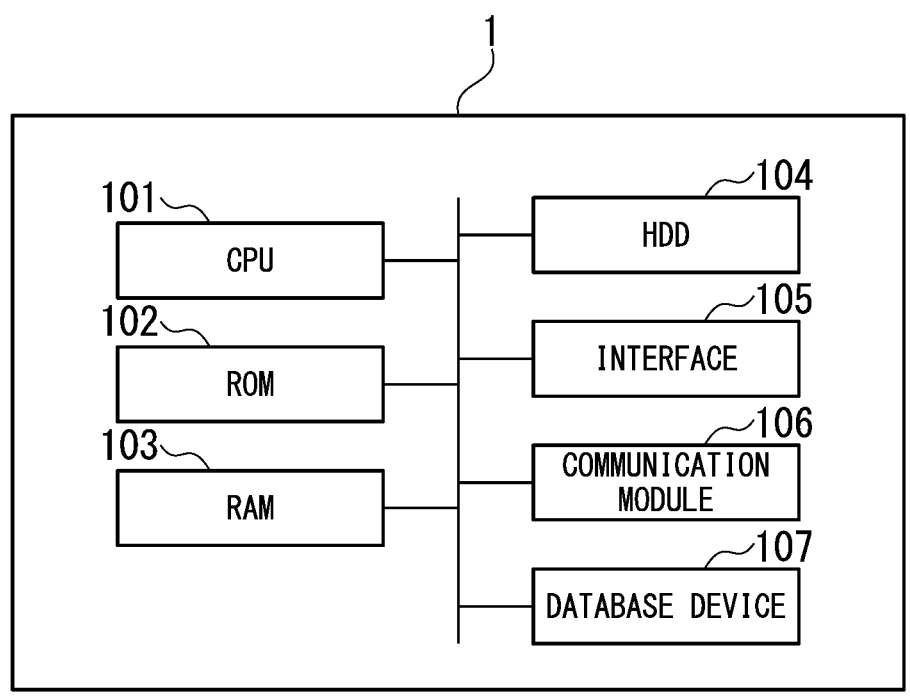
FIG. 2 is a hardware configuration drawing of the settlement control device.

FIG. 2 is a hardware configuration diagram of the settlement control device.

As shown in FIG. 2, the settlement control device 1 is provided with hardware such as a CPU (Central Processing Unit) 101, a ROM (Read Only Memory) 102, a RAM (Random Access Memory) 103, an HDD (Hard Disk Drive) 104, an interface 105, a communication module 106 and a database device 107. The POS terminal 2 and the instruction terminal 4 are also provided with similar hardware. In addition, the POS terminal 2 is provided with an RFID (Radio Frequency Identifier) module that performs non-contact communication with the balance settlement card 3. The HDD 104 may be an SSD (Solid State Drive).

Figure 3:
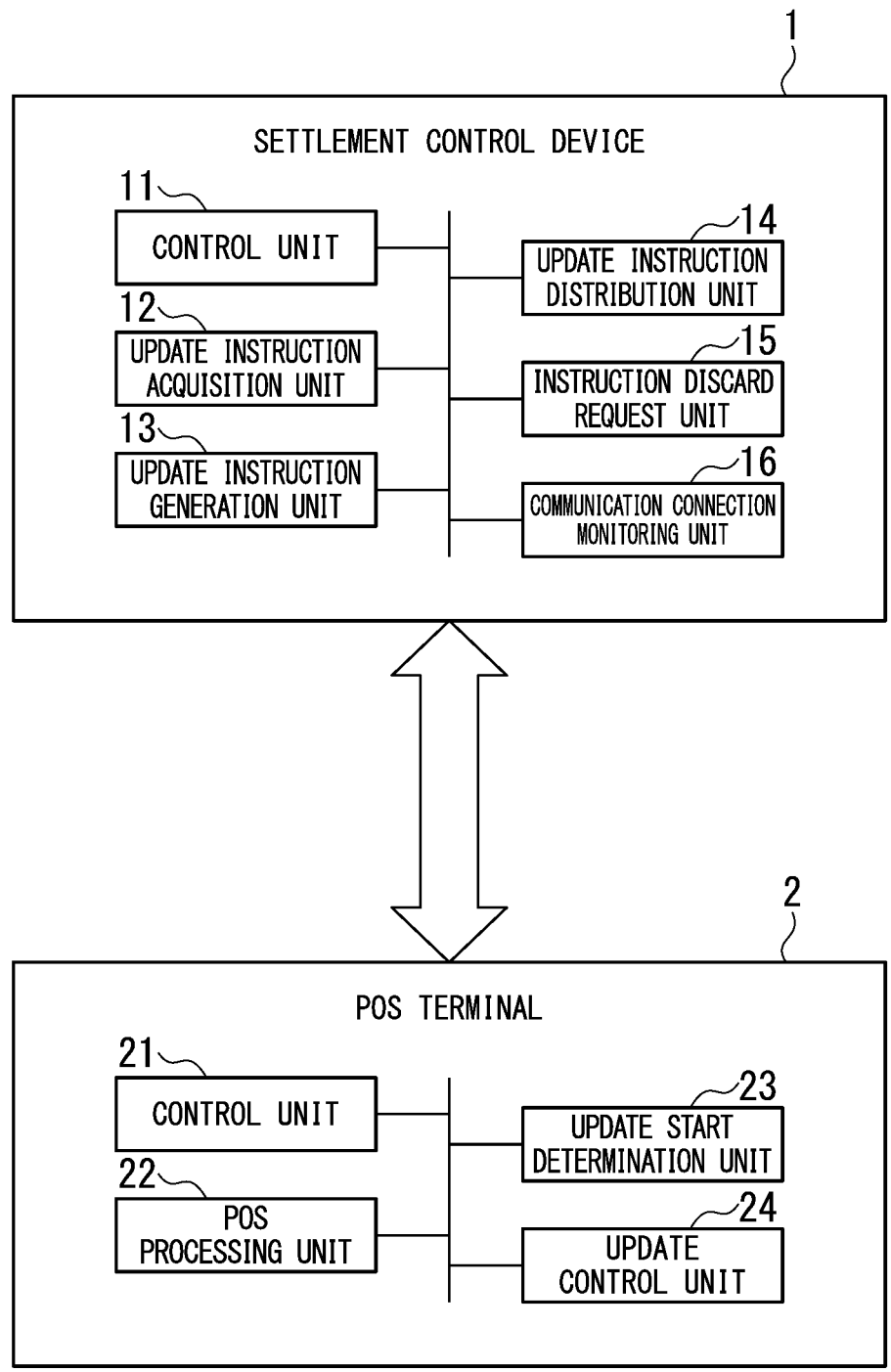
FIG. 3 is a function block drawing of the settlement control device and POS terminal.

FIG. 3 is a function block diagram of the settlement control device and the POS terminal.

The settlement control device 1 executes a settlement control program stored in advance. As a result, the settlement control device 1 is provided with the functions of a control unit 11, an update instruction acquisition unit 12, an update instruction generation unit 13, an update instruction distribution unit 14, an instruction discard request unit 15, and a communication connection monitoring unit 16.

The control unit 11 controls other function units.

The update instruction acquisition unit 12 acquires from the instruction terminal 4 a balance update instruction including at least the card ID (medium identification information) for identifying the balance storage card 3, the type of balance update instruction indicating whether balance update processing for a deposit or withdrawal is to be performed, and the process amount.

The update instruction generation unit 13 determines an update instruction identification number in ascending order every time a balance update instruction is acquired. The update instruction generation unit 13 generates balance update instruction information including the balance update instruction and the determined update instruction identification number.

The update instruction distribution unit 14 distributes the balance update instruction information to each of the plurality of POS terminals 2 connected via the communication network.

The instruction discard request unit 15 receives a completion notification of the balance update processing based on the balance update instruction information from the POS terminal 2. The instruction discard request unit 15 transmits to the POS terminal 2 other than the POS terminal 2 that transmitted the completion notification a request to discard the balance update instruction information including the update instruction identification number used for the balance update processing corresponding to the completion notification.

The communication connection monitoring unit 16 monitors the communication connection state with the POS terminal 2. The update instruction distribution unit 14 decides to transmit balance update instruction information to the POS terminal 2 in which a communication connection with the settlement control device is successful on the basis of the monitoring of the communication connection monitoring unit 16.

The POS terminal 2 executes a POS processing program and an update processing program stored in advance. Accordingly, the POS terminal 2 is provided with the functions of a control unit 21, a POS processing unit 22, an update start determination unit 23, and the update control unit 24.

The control unit 21 controls other function units.

The POS processing unit 22 performs POS processing.

The update start determination unit 23 acquires an update instruction identification number acquired from the balance storage card 3 by non-contact communication with the balance storage card 3 and recorded in the past in the balance storage card 3. In addition, the update start determination unit 23 acquires balance update instruction information received from the settlement control device 1. The update start determination unit 23 compares these update instruction identification numbers, and determines whether or not to start the balance update processing corresponding to the balance update instruction on the basis of the comparison.

When it is determined to start the balance update processing, the update control unit 24 performs control to update the balance and the update instruction identification number recorded in the balance storage card 3 on the basis of the balance update instruction information.

Figure 4:
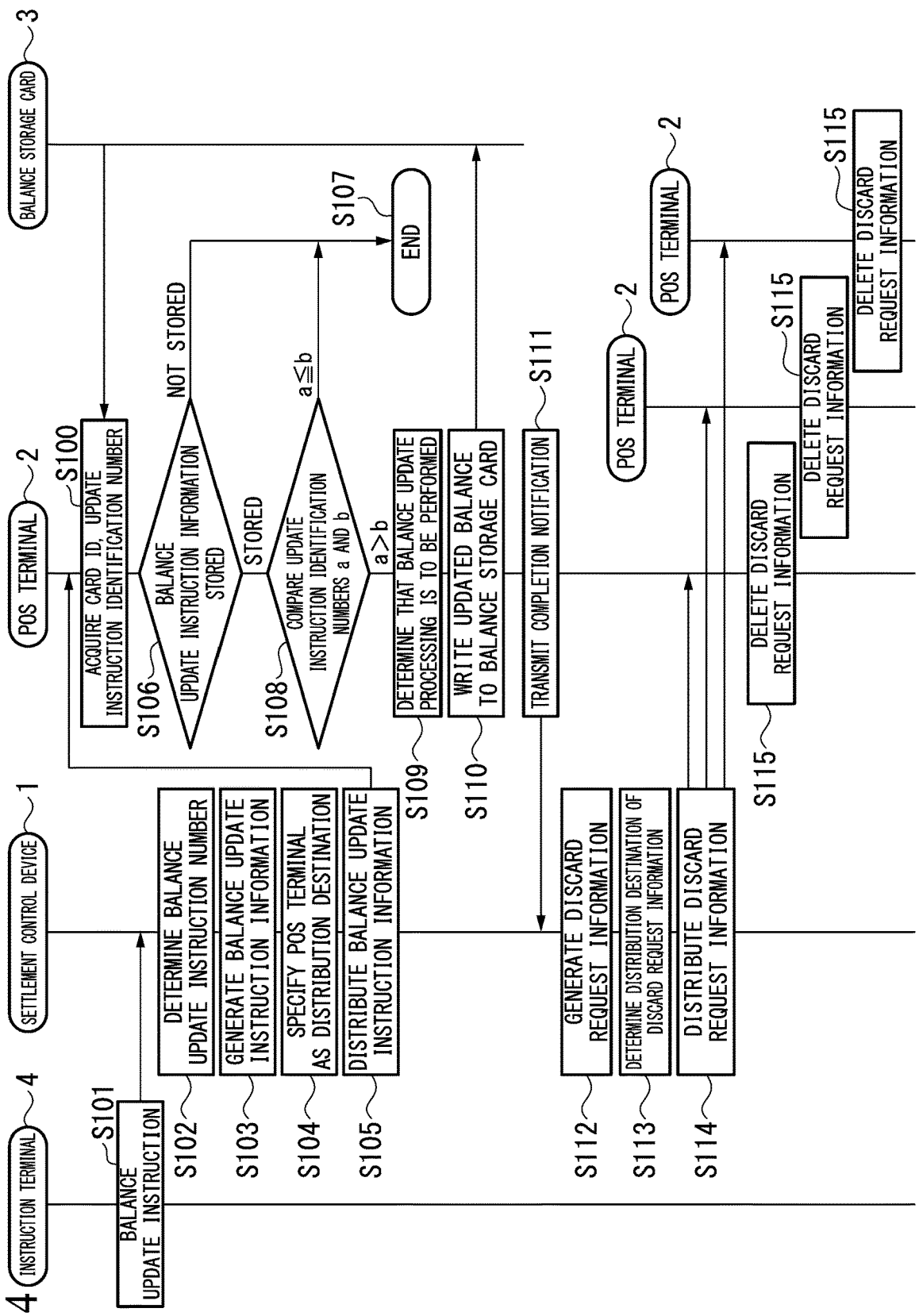
FIG. 4 is a first drawing showing the processing flow of the settlement control system.
Figure 5:
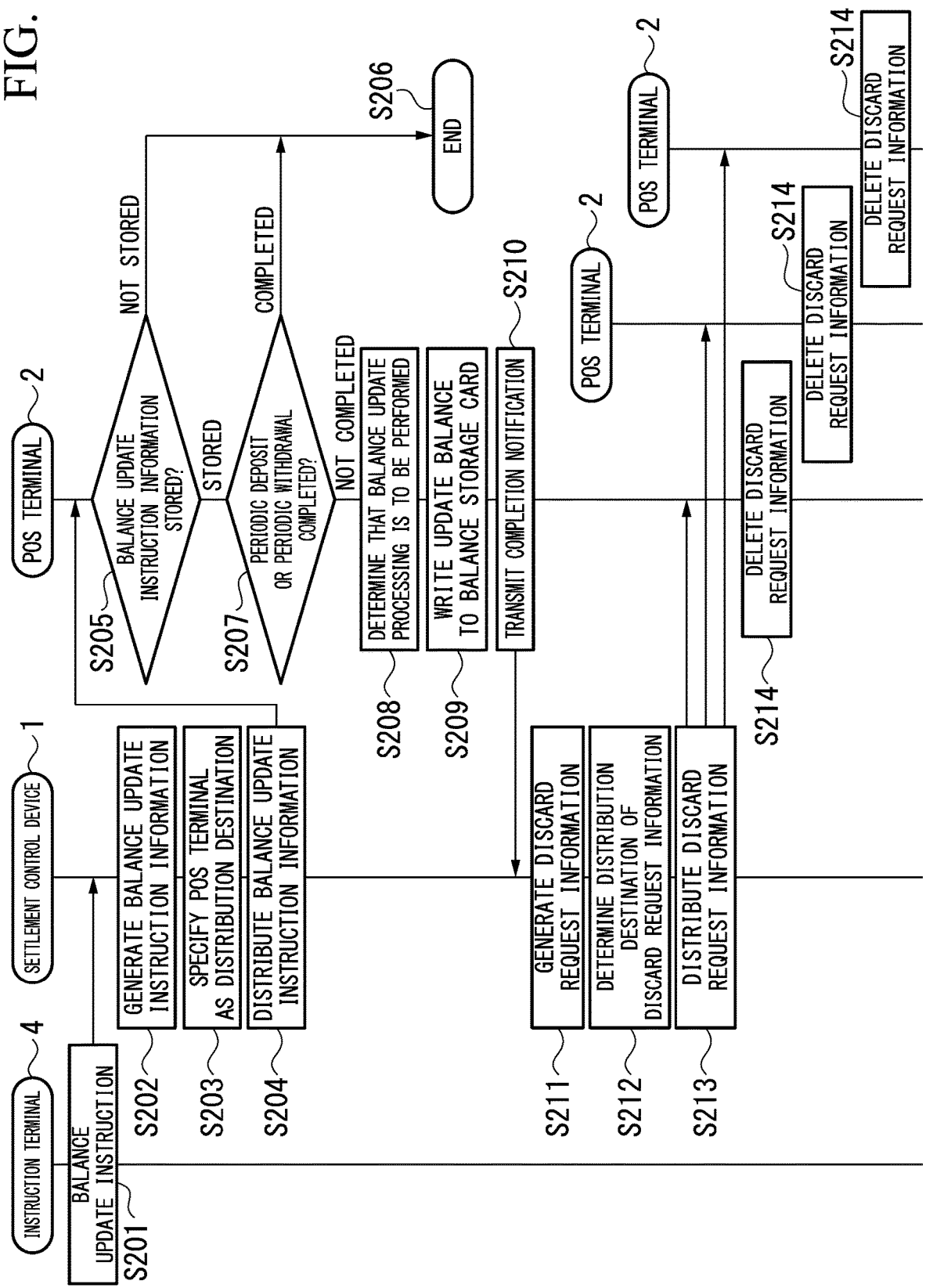
FIG. 5 is a second drawing showing the processing flow of the settlement control system.

FIG. 4 is a diagram showing the processing flow of the settlement control system.

Next, the processing flow of the settlement control system 100 will be described step by step.

First, a settlement instruction person performs an operation for communicative connection between the instruction terminal 4 and the settlement control device 1. The settlement control device 1 is provided with a web server function as an example. The control unit 11 of the settlement control device 1 transmits a settlement instruction page to the instruction terminal 4 on the basis of access from the instruction terminal 4 to the web server function. In this access, the settlement instruction person performs an operation so that his/her ID and password are transmitted from the instruction terminal 4 to the settlement control device 1. Thereby, the settlement control device 1 manages the session in the communication connection of the instruction terminal 4, and specifies the instruction person's ID of the settlement instruction person operating the instruction terminal 4. The settlement instruction page is displayed on the screen of the instruction terminal 4. On the settlement instruction page, a column for selecting the type of balance update instruction indicating a deposit or withdrawal, an amount input column, a card ID input column, a process start button, and the like are provided. The settlement instruction person performs, in each column of the settlement instruction page displayed on the screen of the instruction terminal 4, selection of the type of balance update instruction, input of an amount, input of the card ID of the balance storage card that is the target of the balance update processing based on deposit or withdrawal, and performs an operation on the instruction terminal 4 to press the process start button. Based on this operation, the instruction terminal 4 transmits a balance update instruction including at least the type of balance update instruction that was selected (deposit or withdrawal), the amount, and the card ID to the settlement control device 1 (Step S101).

The update instruction acquisition unit 12 of the settlement control device 1 acquires a balance update instruction from the instruction terminal 4. The update instruction acquisition unit 12 specifies the ID of the settlement instruction person operating the instruction terminal 4 from the plurality of settlement instruction person IDs stored in advance in the database device 107 or the like, on the basis of session information exchanged with the instruction terminal 4. The update instruction acquisition unit 12 outputs the balance update instruction type, amount, card ID, and ID of the specified settlement instruction person included in the balance update instruction to the update instruction generation unit 13.

The update instruction generation unit 13 writes the balance update instruction type, the amount, the card ID, and the ID of the specified settlement instruction person acquired from the update instruction acquisition unit 12 in the balance update instruction table stored in the database device 107. In addition, the update instruction generation unit 13 reads from memory the update instruction identification number used to generate the previous update instruction information, and adds 1 to the update instruction identification number to determine a new balance update instruction number (Step S102). This process is an aspect of the process in which the update instruction generation unit 13 determines the update instruction identification numbers in ascending order every time the balance update instruction is acquired. That is, the update instruction generation unit 13 determines a unique update instruction identification number that is incremented in ascending order. The update instruction generation unit 13 writes the determined balance update instruction number in the balance update instruction table in association with the corresponding balance update instruction information (balance update instruction type, amount, card ID, ID of settlement instruction person). The update instruction generation unit 13 generates balance update instruction information including the type of balance update instruction, amount, card ID, and ID of the settlement instruction person, which were acquired from the update instruction generation unit 13 and written in the balance update instruction table, as well as the update instruction identification number that was determined (Step S103). The update instruction generation unit 13 requests the update instruction distribution unit 14 to distribute the balance update instruction information.

The update instruction distribution unit 14 specifies a plurality of POS terminals 2 as distribution destinations for the balance update instruction information based on the card ID included in the balance update instruction information (Step S104). The plurality of POS terminals 2 as distribution destinations may be POS terminals 2 in the distribution target area that are recorded in advance in the database device 107 or the like in association with the card ID. The plurality of POS terminals 2 as distribution destinations may also be all the POS terminals 2 connected to the settlement control device 1. Alternatively, the plurality of POS terminals 2 as distribution destinations may be all the POS terminals 2 that are capable of communication connection at the current time or that are installed in a distribution area corresponding to the card ID.

The update instruction distribution unit 14 distributes the balance update instruction information to the plurality of specified POS terminals 2 (Step S105). The update instruction distribution unit 14 distributes the previous balance update instruction information to one or a plurality of the POS terminals 2 that are communicably connected without failure among the distribution-destination POS terminals 2. The update instruction distribution unit 14 may later transmit the balance update instruction information to one or a plurality of the POS terminals 2 with which a communicative connection is not possible due to the occurrence of a failure.

The control unit 21 of the POS terminal 2 records the balance update instruction information in the HDD 104 or the like. The POS terminal 2 performs balance update processing using that balance update instruction information in the event of communicating with the balance storage card 3 with the card ID included in the update instruction information. The balance update instruction information is distributed to a plurality of POS terminals 2. For this reason, the balance update instruction information is stored in all the POS terminals 2 at the distribution destinations. Hereinafter will be described a process of performing the balance update processing at a certain POS terminal 2.

The POS processing unit 22 of the POS terminal 2 performs a settlement process for merchandise purchased by a shopper. At this time, the shopper holds his or her balance storage card 3 up to the POS terminal 2. The POS processing unit 22 of the POS terminal 2 performs non-contact communication with the balance storage card 3 and in conjunction therewith performs a settlement process that consists of subtracting the sales amount of the merchandise from the balance recorded in the balance storage card 3. A conventional technique may be used for the settlement processing in the POS processing unit 22.

The POS processing unit 22 instructs the update start determination unit 23 to confirm the presence of balance update processing after the settlement processing is completed or before the settlement processing is started. Even when the POS processing unit 22 of the POS terminal 2 does not perform a settlement process, the control unit 21 instructs the update start determination unit 23 to confirm the presence of balance update processing of the balance storage card 3 with which non-contact communication was performed. Thereafter, the balance update processing described below may be performed.

The update start determination unit 23 acquires the card ID of the balance storage card 3 and an update instruction identification number b (Step S100). The update start determination unit 23 may receive the card ID from the POS processing unit 22 or may acquire the card ID from the balance storage card 3 by newly controlling a non-contact communication connection with the balance storage card 3. Based on the card ID, the update start determination unit 23 determines whether the settlement control device 1 stores balance update instruction information including the card ID (Step S106). If the update start determination unit 23 determines that the balance update instruction information including the card ID is not stored, the process is ended (Step S107).

When the balance start instruction information including the card ID can be searched, the update start determination unit 23 acquires the update instruction identification number a included in the balance instruction information and the update instruction identification number b corresponding to the past balance update processing already recorded in the balance storage card 3. The update start determination unit 23 compares the two update instruction identification numbers a and b (Step S108). When the update instruction identification number a included in the balance update instruction information is greater than the update identification number b read from the balance storage card 3 (a>b), the update start determination unit 23 determines to perform balance update processing (Step S109).

On the other hand, when the update instruction identification number a included in the balance update instruction information is equal to or less than the update identification number b read from the balance storage card 3 (a≤b), the update start determination unit 23 determines not to perform the balance update processing and ends the process (Step S107). The update start determination unit 23, upon determining to perform the balance update processing, outputs the balance update instruction information including the card ID to the update control unit 24.

The update control unit 24 acquires the balance update instruction information on the basis of the card ID. The update control unit 24 determines the type of balance update instruction included in the balance update instruction information. If the balance update instruction type is a deposit, the update control unit 24 reads the balance from the balance storage card 3 and calculates the updated balance by adding the amount included in the balance update instruction information to the balance. The update control unit 24 writes the updated balance to the balance storage card 3. On the other hand, when the type of balance update instruction is a withdrawal, the update control unit 24 reads the balance from the balance storage card 3, and calculates the updated balance by subtracting the amount included in the balance update instruction information from the balance. The update control unit 24 writes the updated balance to the balance storage card 3 (Step S110).

The update control unit 24 acquires the update instruction identification number from the balance update instruction information when the updated balance has been written to the balance storage card 3, and writes the update instruction identification number to the balance storage card 3. Then, the update control unit 24 completes the balance update processing with the balance storage card 3. When the balance update processing is completed, the update control unit 24 transmits a completion notification to the settlement control device 1 (Step S111). The completion notification includes the update instruction identification number used in the balance update processing. When the update control unit 24 cannot transmit the completion notification to the settlement control device 1 due to a poor communication connection with the settlement control device 1, the update control unit 24 repeats retransmission after a predetermined time has elapsed.

The settlement control device 1 receives the completion notification. The instruction discard request unit 15 of the settlement control device 1 acquires the update instruction identification number included in the completion notification, and generates discard request information including the update instruction identification number (Step S112). The instruction discard request unit 15 determines the distribution destination of the discard request information (Step S113).

The instruction discard request unit 15 distributes the discard request information to the determined delivery destination (Step S114). The distribution destination of the discard request information may be each POS terminal 2 that is the distribution destination of the update instruction information including the update instruction identification number included in the discard request information. Alternatively, the distribution destination of the discard request information may be all the POS terminals 2 of the distribution destination of the update instruction information other than the POS terminals 2 that have performed the balance update processing based on the update instruction information including the update instruction identification number included in the discard request information.

The POS terminal 2 that has received the discard request information reads the update instruction identification number from the discard request information, and deletes the balance update instruction information including the update instruction identification number from the stored update instruction information received in the past (Step S115). Thereby, it is possible to prevent the balance update processing from being performed based on the same balance update instruction information in the POS terminal 2 other than the POS terminal 2 that has performed the above-described update process.

According to the above-described processing, the settlement control device 1 distributes and stores the balance update instruction information to all the POS terminals 2 installed in a predetermined range in advance. Moreover, the settlement control device 1 performs the balance update processing of the balance storage card 3, when a certain POS terminal 2 of the POS terminals 2 has achieved a communication connection with the balance storage card 3. When the settlement control device 1 instructs the POS terminal 2 to perform the balance update processing for the first time when the balance storage card 3 and the POS terminal 2 are connected for communication, in the event of a failure between the POS terminal 2 and the settlement control device 1, the balance update processing of the balance storage card 3 cannot be performed. However, according to the processing of the settlement control device 1 and the POS terminal 2 described above, balance update instruction information is stored in the POS terminal 2 in advance. For this reason, when the POS terminal 2 and the balance storage card 3 are connected for communication, the POS terminal 2 does not need to be connected to the settlement control device 1 for communication. Therefore, even in an area where the communication connection between the POS terminal 2 and the settlement control device 1 is often unstable, by the balance update instruction stored in advance by the settlement control device 1, the POS terminal 2 can appropriately perform the balance update processing to the balance storage card 3 based on that balance update instruction.

Further, a case in which a communication failure occurs between the POS terminal 2 and the settlement control device 1 when the balance update processing is performed between the POS terminal 2 and the balance storage card 3 will be exemplified. Even in such a case, the update instruction identification number newly written in the balance storage card 3 and the update instruction identification number included in the balance update instruction information recorded in another POS terminal 2 that does not perform the balance update processing have the same values.

As a result, other POS terminals 2 do not perform the balance update processing when the update instruction identification numbers are equal. For this reason, the balance update processing is not performed based on the balance update instruction information distributed again at the same timing in the other POS terminals 2.

The communication connection monitoring unit 16 of the settlement control device 1 monitors the communication connection with the POS terminal 2 before the above balance update instruction information is distributed. The communication connection monitoring unit 16 generates a data table containing information on the POS terminals 2 with a poor communication connection and the POS terminals 2 with a good communication connection. The update instruction distribution unit 14 may specify a POS terminal 2 with a good communication connection, which is actually a distribution destination of balance update instruction information, among the POS terminals 2 that have been determined as distribution destinations by checking this data table.

The update instruction distribution unit 14, on the basis of the identification information of the POS terminal 2 where the user used the balance storage card 3, may estimate the user's movement range, and create a data table that associates identification information of POS terminals 2 installed in the area corresponding to the movement range and the card ID of the balance storage card 3 of the user. Then, when transmitting the balance update instruction information, the update instruction distribution unit 14 may determine the POS terminal 2 installed in the area corresponding to the movement range of the user as the distribution destination of the balance update instruction information.

When the control unit 21 of the POS terminal 2 has received balance update instruction information including a plurality of different update instruction identification numbers including the same card ID, the balance update instruction information may be integrated into one balance update instruction information including the plurality of update instruction identification numbers. For example, a case will be described in which a plurality of sets of balance update instruction information including the same card ID are received, with all the types of balance update instructions being deposits. In this case, the control unit 21 generates and stores new balance update instruction information including the total amount of all the amounts of the plurality of sets of balance update instruction information, the card ID, the type of balance update instruction indicating a deposit, and each balance instruction identification number included in all the sets of balance update instruction information. Then, the update control unit 24 performs a subsequent update processing on the basis of the result of comparing the update instruction identification number with the largest number and the update instruction identification number recorded in the balance storage card 3. In this case, when transmitting the completion notification to the settlement control device 1, the update control unit 24 may transmit a completion notification including all the update instruction identification numbers included in the balance update instruction information generated in the POS terminal 2. As a result, the instruction discard request unit 15 of the settlement control device 1 need only distribute each set of discard request information including the respective update instruction identification number to the POS terminal 2.

Similarly, a case will be exemplified in which a plurality of sets of balance update instruction information including the same card ID are received, with all the types of balance update instructions being withdrawals. In this case, the control unit 21 generates and stores new balance update instruction information including the total amount of all the amounts of the plurality of sets of balance update instruction information, the card ID, the type of balance update instruction indicating withdrawal, and each update instruction identification number included in all the sets of balance update instruction information. Then, the update control unit 24 performs subsequent update processing on the basis of the result of comparing the update instruction identification number with the largest number and the update instruction identification number recorded in the balance storage card 3.

In addition, a case will be exemplified in which a plurality of sets of balance update instruction information including the same card ID are received, with the type of balance update instructions being withdrawal and deposit. In this case, the control unit 21 may calculate the subtraction amount or the addition amount by offsetting the withdrawal amount and the deposit amount of the plurality of sets of balance update instruction information. The control unit 21 may generate and store new balance update instruction information including the subtraction amount or the addition amount and including each update information identification number included in all the sets of balance update instruction information.

In the above-described processing, the case where the settlement instruction person arbitrarily transmits a balance update instruction to the settlement control device 1 using the instruction terminal 4 has been described. However, the settlement instruction person can also send a periodic balance update instruction to the settlement control device 1. In this case, the instruction terminal 4 and the settlement control device 1 are connected for communication in the same manner as the above-described processing. The instruction terminal 4 transmits a balance update instruction including at least the balance update instruction type (periodic deposit or withdrawal), the amount, and the card ID to the settlement control device 1 based on the operation of the settlement instruction person (Step S201).

The update instruction acquisition unit 12 of the settlement control device 1 acquires the balance update instruction from the instruction terminal 4. The update instruction acquisition unit 12 specifies the ID of the settlement instruction person who operated the instruction terminal 4 from a plurality of settlement instruction person IDs stored in advance in the database device 107 or the like based on information of a session exchanged with the instruction terminal 4. The update instruction acquisition unit 12 outputs the balance update instruction type, amount, card ID, and ID of the identified settlement instruction person who was specified, which are included in the balance update instruction, to the update instruction generation unit 13.

The update instruction generation unit 13 generates the balance update instruction information including the balance update instruction type, the amount, and the card ID without determining the balance update instruction number when the balance update instruction type indicates a periodic deposit or withdrawal (Step S202).

The update instruction distribution unit 14 specifies a plurality of POS terminals 2 to which the balance update instruction information is to be distributed on the basis of the card ID included in the balance update instruction information (Step S203). This distribution method may be the same as the above processing. The update instruction distribution unit 14 distributes the balance update instruction information to the plurality of specified POS terminals 2 of the distribution destinations (Step S204).

The control unit 21 of the POS terminal 2 records the update instruction information on the HDD 104 or the like. The POS terminal 2 performs the balance update processing using the balance update instruction information when communicating with the balance storage card 3 corresponding to the card ID included in the update instruction information. The balance update instruction information is distributed to a plurality of POS terminals 2. For this reason, the balance update instruction information is stored in all the POS terminals 2 of the distribution destinations. Hereinbelow, a process when the balance update processing is performed in a certain POS terminal 2 will be described.

When the POS terminal 2 and the balance storage card 3 perform contactless communication, the control unit 21 of the POS terminal 2 instructs the update start determination unit 23 to confirm the presence of balance update processing of the balance storage card 3 that performed the contactless communication. The update start determination unit 23 acquires the card ID of the balance storage card 3. On the basis of the card ID, the update start determination unit 23 determines whether or not the settlement control device 1 has stored balance update instruction information including the card ID (Step S205). If the update start determination unit 23 has determined that the balance update instruction information including the card ID has not been stored, the process ends (Step S206).

When the balance update instruction information including the card ID can be searched, the update start determination unit 23 detects that the type of the balance update instruction included in the balance update instruction information is a periodic deposit or withdrawal.

When the type of balance update instruction included in the balance update instruction information indicates periodic deposit (or periodic withdrawal), the update start determination unit 23 inquires whether the periodic deposit (or the periodic withdrawal) indicated by the balance update instruction type has been completed, on the basis of the balance storage card 3 (Step S207). The balance storage card 3 can store information indicating whether or not the periodic deposit (or periodic withdrawal) indicated by the type of the balance update instruction has been completed. The balance storage card 3, in the case of having stored that the periodic deposit (or periodic withdrawal) is completed, notifies the POS terminal 2 of the completion. The balance storage card 3, in the case of not having stored that the periodic deposit (or periodic withdrawal) has been completed, notifies the POS terminal 2 of the incompletion. If notified of completion, the update start determination unit 23 ends the process (Step S206). On the other hand, if notified of incompletion, the update start determination unit 23 determines to perform the balance update processing (Step S208). Then, the update start determination unit 23 outputs the card ID and balance update instruction information to the update control unit 24.

The update control unit 24 acquires balance update instruction information on the basis of the card ID. The update control unit 24 judges the type of balance update instruction included in the balance update instruction information. When the balance update instruction type is a periodic deposit, the update control unit 24 reads the balance from the balance storage card 3 and adds the amount included in the balance update instruction information to the balance thereof to calculate the updated balance. The update control unit 24 writes the updated balance to the balance storage card 3. On the other hand, when the balance update instruction type is a periodic withdrawal, the update control unit 24 reads the balance from the balance storage card 3 and subtracts the amount included in the balance update instruction information from the balance thereof to calculate the updated balance. The update control unit 24 writes the updated balance to the balance storage card 3 (Step S209).

The update control unit 24 writes completion information of the balance update instruction to the balance storage card 3 when the writing of the updated balance to the balance storage card 3 is completed. In addition to the type of periodic deposit or periodic withdrawal, attributes of that periodic deposit or periodic withdrawal stored as the type (the name of the settlement instruction person, the date when the balance update processing was performed) may also be recorded in the balance storage card 3 as the completion information of the balance update instruction.

When the update control unit 24 finishes writing the updated balance and the completion information of the balance update instruction to the balance storage card 3, the update control unit 24 acquires the balance update instruction type and card ID from the balance update instruction information, and transmits a completion notification including these pieces of information to the settlement control device 1 (Step S210). When the update control unit 24 cannot transmit the completion notification to the settlement control device 1 due to a poor communication connection with the settlement control device 1, the update control unit 24 repeats retransmission after a predetermined time has elapsed.

The settlement control device 1 receives the completion notification. The instruction discard request unit 15 of the settlement control device 1 acquires the card ID and the balance update instruction type included in the completion notification, and writes the card ID and the balance update instruction type in the periodic balance update table in association with each other. The settlement instruction person may operate the instruction terminal 4 so that information in the periodic balance update table can be acquired from the settlement device 1.

The instruction discard request unit 15 of the settlement control device 1 acquires the card ID and balance update instruction type included in the completion notification, and generates discard request information including the card ID and balance update instruction type (Step S211). The instruction discard request unit 15 determines the distribution destination of the discard request information (Step S212).

The instruction discard request unit 15 distributes the discard request information to the determined delivery destination (Step S213). The distribution destination of the discard request information may be each POS terminal 2 that is the distribution destination of the update instruction information including the card ID and the balance update instruction type included in the discard request information. Alternatively, the distribution destination of the discard request information may be all the POS terminals 2 that are the distribution destination of the update instruction information, other than the POS terminals 2 that performed the balance update processing on the basis of the balance instruction information including the card ID and the balance update instruction type included in the discard request information.

The POS terminals 2 that receive the discard request information read the card ID and the balance update instruction type from the discard request information and, among the balance update instruction information received and stored in the past, delete the balance update instruction information including that card ID and the balance update instruction (Step S214). Thereby, it is possible to prevent the balance update processing based on the same periodic balance update instruction information from being performed in the POS terminals 2 other than the POS terminals 2 that have performed the periodic update process.

According to the above-described processing, in the case of a periodic deposit or withdrawal, the update instruction identification number is used in the balance update processing. For this reason, the generation of the update instruction identification number and the process of comparing update instruction identification numbers need not be performed, and the balance update processing can be easily performed without imposing a processing load.

Figure 6:
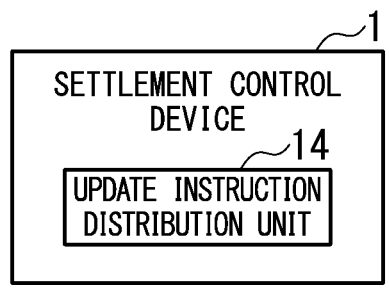
FIG. 6 is a drawing showing the minimum configuration of the settlement control device.

FIG. 6 is a diagram showing a minimum configuration of the settlement control device.

The settlement control device 1 need only be provided with at least the update instruction acquisition unit 12 and the update instruction distribution unit 14. The update instruction acquisition unit 12 acquires a balance update instruction including a card ID and a processing amount. The update instruction distribution unit 14 distributes balance update instruction information including a balance update instruction and an update instruction identification number corresponding to the balance update instruction to each of a plurality of terminal devices such as the POS terminal 2.

Figure 7:
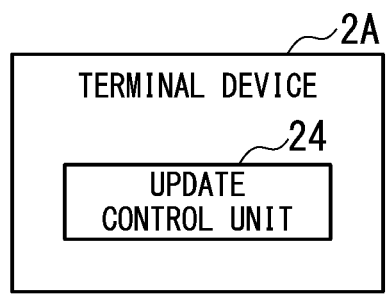
FIG. 7 is a drawing showing the minimum configuration of the terminal device.

FIG. 7 is a diagram illustrating a minimum configuration of the terminal device.

In the above processing, an example in which the balance storage card 3 communicates with the POS terminal 2 was described. However, a terminal device 2A such as a tablet terminal, a mobile phone, or a small wireless device different from the POS terminal 2 may perform contactless communication with the balance storage card 3. The terminal device 2A is provided with at least an update start determination unit 23 and an update control unit 24. The update start determination unit 23 compares an update instruction identification number acquired from the balance storage card 3 through communication with the balance storage card 3 having the same card ID and recorded in the past in the balance storage card 3 and the update instruction identification number included in the balance update instruction information, and on the basis of that comparison determines whether or not to start the balance update processing corresponding to the balance update instruction. When it is determined that the balance update processing is to be started, the update control unit 24 updates the balance and the update instruction identification number recorded in the balance storage card 3 with the matching card ID on the basis of the balance update instruction information.

A part or all of the above-described embodiment can be described as in the following supplementary notes, but is not limited thereto.

(Supplementary Note 1)

A settlement control system comprising:
   a plurality of terminal devices configured to wirelessly communicate with a balance storage medium; and
   a settlement control device that is communicably connected to each of the plurality of terminal devices,
wherein the settlement control device comprises:
   an update instruction distribution unit configured to distribute, to each of the terminal devices, balance update instruction information including a balance update instruction and an update instruction identification number corresponding to the balance update instruction; and
the terminal devices comprises:
   an update control unit configured to perform balance update processing corresponding to the balance update instruction on the basis of a comparison between an update instruction identification number that has been acquired from the balance storage medium and that is recorded in the balance storage medium, and the update instruction identification number included in the balance update instruction information.

(Supplementary Note 2)

The settlement control system according to supplementary note 1, wherein the settlement control device comprises:
   an update instruction generation unit configured to sequentially determine the update instruction identification number for each balance update instruction and generate the balance update instruction information including the balance update instruction and the determined update instruction identification number.

(Supplementary Note 3)

The settlement control system according to supplementary note 1 or supplementary note 2, wherein the settlement control device comprises:
   an instruction discard request unit configured to receive a completion notification of the balance update processing from the terminal device and that transmit a request for discarding balance update instruction information including the update instruction identification number to a terminal device different from the terminal device that transmitted the completion notification.

(Supplementary Note 4)

The settlement control system according to any one of supplementary note 1 to supplementary note 3, wherein the settlement control device comprises:
   a communication connection monitoring unit configured to monitor a communication connection with the terminal device; and
   the update instruction distribution unit transmits the balance update instruction information to the terminal device in which a communication connection with the settlement control device is successful on the basis of the monitoring of the communication connection.

(Supplementary Note 5)

The settlement control system according to any one of supplementary note 1 to supplementary note 4, wherein the update instruction distribution unit determines the plurality of terminal devices to which the balance update instruction information including medium identification information of the balance storage medium is transmitted on the basis of a movement range of the balance storage medium.

(Supplementary Note 6)

The settlement control system according to any one of supplementary note 1 to supplementary note 3, wherein when balance update instruction information including the balance update instruction and the update instruction identification number determined in ascending order is generated,
   the update control unit of the terminal device performs the balance update processing when the update instruction identification number included in the balance update instruction information is greater than the acquired update instruction identification number recorded in the balance storage medium.

(Supplementary Note 7)

A settlement control device comprising:
   an update instruction distribution unit configured to distribute balance update instruction information including a balance update instruction and an update instruction identification number corresponding to the balance update instruction to each of a plurality of terminal devices that wirelessly communicate with a balance storage medium.

(Supplementary Note 8)

The settlement control device according to supplementary note 7 comprises:
   an update instruction generation unit configured to sequentially determine the update instruction identification number for each balance update instruction and generate the balance update instruction information including the balance update instruction and the determined update instruction identification number.

(Supplementary Note 9)

The settlement control device according to supplementary note 7 or supplementary note 8 comprises:
   an instruction discard request unit configured to receive a completion notification of balance update processing corresponding to the balance update instruction from the terminal device and transmit a request for discarding balance update instruction information including the update instruction identification number to a terminal device different from the terminal device that transmitted the completion notification.

(Supplementary Note 10)

The settlement control device according to any one of supplementary note 7 to supplementary note 9, comprises:
   a communication connection monitoring unit configured to monitor a communication connection with the terminal device,
   wherein the update instruction distribution unit transmits the balance update instruction information to the terminal device in which a communication connection with the settlement control device is successful on the basis of the monitoring of the communication connection.

(Supplementary Note 11)

The settlement control device according to any one of supplementary note 7 to supplementary note 10, wherein the update instruction distribution unit determines the plurality of terminal devices to which the balance update instruction information including medium identification information of the balance storage medium is transmitted on the basis of a movement range of the balance storage medium.

(Supplementary Note 12)

A terminal device comprising:
   an update instruction receiving unit configured to receive from a settlement control device balance update instruction information including a balance update instruction and an update instruction identification number corresponding to the balance update instruction; and
   an update control unit configured to perform balance update processing corresponding to the balance update instruction on the basis of a comparison between an update instruction identification number that has been acquired from a balance storage medium and that is recorded in the balance storage medium, and the update instruction identification number included in the balance update instruction information.

(Supplementary Note 13)

The terminal device according to supplementary note 12, wherein the update instruction receiving unit receives from the settlement control device the balance update instruction information including the update instruction identification number determined in ascending order every time the balance update instruction is acquired and the balance update instruction; and
   the update control unit performs the balance update processing when the update instruction identification number included in the balance update instruction information is greater than the acquired update instruction identification number recorded in the balance storage medium.

(Supplementary Note 14)

A settlement control method of a settlement control system having a plurality of terminal devices that wirelessly communicate with a balance storage medium, and a settlement control device that is communicably connected to each of the plurality of terminal devices, the settlement control method comprising:
   distributing, by the settlement control device, to each of the terminal devices, balance update instruction information including a balance update instruction and an update instruction identification number corresponding to the balance update instruction; and
   performing, by the terminal devices, balance update processing corresponding to the balance update instruction on the basis of a comparison between an update instruction identification number that has been acquired from the balance storage medium and that is recorded in the balance storage medium, and the update instruction identification number included in the balance update instruction information.

(Supplementary Note 15)

A settlement control method comprising:
   distributing balance update instruction information including a balance update instruction and an update instruction identification number corresponding to the balance update instruction to each of a plurality of terminal devices that wirelessly communicate with a balance storage medium.

(Supplementary Note 16)

A processing method comprising:
   receiving from a settlement control device balance update instruction information including a balance update instruction and an update instruction identification number corresponding to the balance update instruction; and
   performing balance update processing corresponding to the balance update instruction on the basis of a comparison between an update instruction identification number that has been acquired from a balance storage medium and that is recorded in the balance storage medium, and the update instruction identification number included in the balance update instruction information.

(Supplementary Note 17)

A program that causes a computer of a settlement control device to execute processes, the processes comprising:
   distributing balance update instruction information including a balance update instruction and an update instruction identification number corresponding to the balance update instruction to each of a plurality of terminal devices that wirelessly communicate with a balance storage medium.

(Supplementary Note 18)

A program that causes a computer of a terminal device to execute processes, the processes comprising:
   receiving from a settlement control device balance update instruction information including a balance update instruction and an update instruction identification number corresponding to the balance update instruction; and
   performing balance update processing corresponding to the balance update instruction on the basis of a comparison between an update instruction identification number that has been acquired from a balance storage medium and that is recorded in the balance storage medium, and the update instruction identification number included in the balance update instruction information.

Each of the above devices has a computer system therein. Further, each process described above is stored in a computer-readable recording medium in the form of a program, with each process described above being performed by the computer reading and executing the program. Here, the computer-readable recording medium refers to a magnetic disk, a magneto-optical disk, a CD-ROM, a DVD-ROM, a semiconductor memory, or the like. Alternatively, the computer program may be distributed to the computer via a communication line, and the computer that has received the distribution may execute the program.

Moreover, the program described above may realize only a portion of the functions mentioned above. Further, the program may be a so-called differential file (differential program), which realizes the functions mentioned above in combination with a program already recorded in the computer system.

INDUSTRIAL APPLICABILITY

According to the present invention, even in an area where the communication connection between a terminal device and a settlement control device often becomes unstable, the settlement control device can appropriately update the balance of a balance storage card on the basis of a balance update instruction by which a settlement control device receives an instruction.

REFERENCE SIGNS LIST

1: Settlement control device
2: POS terminal
3: Balance storage card
4: Instruction terminal
11: Control unit
12: Update instruction acquisition unit
13: Update instruction generation unit
14: Update instruction distribution unit
15: Instruction discard request unit
16: Communication connection monitoring unit
21: Control unit
22: POS processing unit
23: Update start determination unit
24: Update control unit

The invention claimed is:

1. A settlement control system comprising:
  a plurality of terminal devices configured to wirelessly communicate with a balance storage medium; and
  a settlement control device that is communicably connected to each of the plurality of terminal devices,
  wherein the settlement control device comprises:
    an update instruction generation unit configured to sequentially determine an update instruction identification number for each balance update instruction and generate balance update instruction information including the balance update instruction and the determined update instruction identification number;
    an update instruction distribution unit configured to distribute, to each of the plurality of terminal devices, the balance update instruction information, generated by the update instruction generation unit, which includes the same balance update instruction and the same update instruction identification number, and
  each of the plurality of terminal devices comprises:
    a storage configured to store the balance update instruction information in advance of communicating with the balance storage medium; and
    an update control unit configured to determine, when communicating with the balance storage medium, whether or not to perform balance update processing corresponding to the balance update instruction on the basis of a result of a comparison of magnitude of values between an update instruction identification number that has been acquired from the balance storage medium and that is recorded in the balance storage medium, and the update instruction identification number included in the balance update instruction information stored in the storage, and perform the balance update processing when it is determined that the balance update process is to be performed.

2. The settlement control system according to claim 1, wherein the settlement control device comprises:
  an instruction discard request unit configured to receive a completion notification of the balance update processing from the terminal device and that transmit a request for discarding balance update instruction information including the update instruction identification number to a terminal device different from the terminal device that transmitted the completion notification.

3. The settlement control system according to claim 1, wherein the settlement control device comprises:
  a communication connection monitoring unit configured to monitor a communication connection with the terminal device; and
  the update instruction distribution unit transmits the balance update instruction information to the terminal device in which a communication connection with the settlement control device is successful on the basis of the monitoring of the communication connection.

4. The settlement control system according to claim 1, wherein the update instruction distribution unit determines the plurality of terminal devices to which the balance update instruction information including medium identification information of the balance storage medium is transmitted on the basis of a movement range of the balance storage medium.

5. The settlement control system according to claim 1, wherein the balance update instruction information including the balance update instruction and the update instruction identification number determined in ascending order is generated,
  the update control unit of the each of the plurality of terminal devices performs the balance update processing when the update instruction identification number included in the balance update instruction information is larger than the acquired update instruction identification number recorded in the balance storage medium.

6. The settlement control system according to claim 1, wherein the update instruction distribution unit of the settlement control device distributes the same balance update instruction information to each of the plurality terminal devices installed in an estimated movement range of a user corresponding to the balance update instruction information.

7. A settlement control method of a settlement control system comprising a plurality of terminal devices that wirelessly communicate with a balance storage medium, and a settlement control device that is communicably connected to each of the plurality of terminal devices, the settlement control method comprising:
  sequentially determining, by the settlement control device, an update instruction identification number for each balance update instruction and generate balance update instruction information including the balance update instruction and the determined update instruction identification number;
  distributing, by the settlement control device, to each of the plurality of terminal devices, the balance update instruction information, generated by the update instruction generation unit, which includes the same balance update instruction and the same update instruction identification number;
  storing, by each of the plurality of terminal devices, the balance update instruction information into a storage of the terminal device in advance of communicating with the balance storage medium; and
  determining, by the each of the plurality of terminal devices, when communicating with the balance storage medium, whether or not to perform balance update processing corresponding to the balance update instruction on the basis of a result of a comparison of magnitude of values between an update instruction identification number that has been acquired from the balance storage medium and that is recorded in the balance storage medium, and the update instruction identification number included in the balance update instruction information stored in the storage, and performing the balance update processing when it is determined that the balance update process is to be performed.

8. The settlement control system according to claim 1, wherein the each of the plurality of terminal devices communicates with the balance storage medium by a radio frequency identifier module.

* * * * *